United States Patent
Hu et al.

(10) Patent No.: US 11,463,907 B2
(45) Date of Patent: *Oct. 4, 2022

(54) BASE STATION EQUIPMENT, COMMUNICATION TERMINAL, COMMUNICATION SYSTEM, PROGRAM, FRAME TRANSMITTING METHOD, AND DATA STRUCTURE

(71) Applicant: Sony Corporation, Tokyo (JP)

(72) Inventors: Yueting Hu, Kanagawa (JP); Ryota Kimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 16/840,460

(22) Filed: Apr. 6, 2020

(65) Prior Publication Data

US 2020/0245190 A1     Jul. 30, 2020

Related U.S. Application Data

(63) Continuation of application No. 16/073,120, filed as application No. PCT/JP2016/087510 on Dec. 16, 2016, now Pat. No. 10,659,990.

(30) Foreign Application Priority Data

Feb. 2, 2016    (JP) .............................. JP2016-017946

(51) Int. Cl.
    *H04W 28/06*     (2009.01)
    *H04L 65/40*     (2022.01)
    (Continued)

(52) U.S. Cl.
    CPC ............. *H04W 28/06* (2013.01); *H04L 29/08* (2013.01); *H04L 29/10* (2013.01);
    (Continued)

(58) Field of Classification Search
None
See application file for complete search history.

(56) References Cited

U.S. PATENT DOCUMENTS 9,001,798 B2 *   4/2015   Papasakellariou .... H04L 1/1861
                                                                             370/336
9,445,338 B2 *   9/2016   He ...................... H04L 67/1076
(Continued)

FOREIGN PATENT DOCUMENTS

JP       2011-228940 A     11/2011
WO     2011/100047 A1    8/2011
(Continued)

OTHER PUBLICATIONS

Communication pursuant to Article 94(3) EPC, dated Feb. 11, 2020, issued in corresponding European Patent Application No. 16 889 428.5.
(Continued)

*Primary Examiner* — Shripal K Khajuria
(74) *Attorney, Agent, or Firm* — Xsensus LLP

(57) ABSTRACT

If the sequence of a traffic of a first communication link from a communication apparatus to another communication apparatus includes a traffic of a second communication link from that another communication apparatus to a communication apparatus, latency is reduced, thereby saving processing time.

If, after data is transmitted from a communication apparatus to another communication apparatus by the upper layer, a data receive response signal is required from that another communication apparatus to the communication apparatus, a predetermined frame including transmission grant information for that another communication apparatus to transmit the receive response signal and data is generated in the communication apparatus. The communication apparatus transmits this generated frame to that another communica- (Continued)

tion apparatus. That is, data and transmission grant information are transmitted from the communication apparatus to that another communication apparatus as a predetermined frame.

13 Claims, 17 Drawing Sheets

(51) Int. Cl.
    *H04L 69/32*     (2022.01)
    *H04W 80/06*     (2009.01)
    *H04W 72/12*     (2009.01)
    *H04W 72/14*     (2009.01)

(52) U.S. Cl.
    CPC ... *H04W 72/1268* (2013.01); *H04W 72/1289* (2013.01); *H04W 72/14* (2013.01); *H04W 80/06* (2013.01); *H04W 72/1273* (2013.01)

(56) References Cited

U.S. PATENT DOCUMENTS

| | | |
|---|---|---|
| 2007/0140165 A1 | 6/2007 | Kim et al. |
| 2010/0182947 A1 | 7/2010 | Jong et al. |
| 2010/0195563 A1 | 8/2010 | Jong et al. |
| 2010/0195564 A1 | 8/2010 | Jong et al. |
| 2014/0211767 A1 | 7/2014 | Lunttila et al. |
| 2014/0269452 A1* | 9/2014 | Papasakellariou .... H04L 1/1854 370/280 |
| 2015/0244510 A1* | 8/2015 | Chae .................... H04L 1/1893 370/329 |
| 2015/0245344 A1* | 8/2015 | You ...................... H04L 5/0055 370/280 |
| 2016/0036559 A1* | 2/2016 | Aiba ..................... H04L 1/0067 370/329 |

FOREIGN PATENT DOCUMENTS

| | | |
|---|---|---|
| WO | 2014/191050 A1 | 12/2014 |
| WO | WO-2015141177 A1 | 9/2015 |

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP Standard; Technical Specification; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V8.8.0, Sep. 19, 2009 (Sep. 19, 2009), pp. 1-77, XP051296169, [retrieved Sep. 19, 2009].

Huawei, HiSilicon, "Uplink latency reduction for synchronized UEs," 3GPP TSG-RAN WG2 Meeting #91, R2-153374, Beijing, China, Aug. 24-28, 2015, pp. 1-5.

"3rd Generation Partnership Project; Technical Specification Group Radio Access Network; Evolved Universal Terrestrial Radio Access (E-UTRA); Medium Access Control (MAC) protocol specification (Release 13)," Technical Specification, 3GPP TS 36.321 V13.0.0, pp. 1-82 (Dec. 2015).

Extended European Search Report for European Application No. 16889428.5, dated Oct. 2, 2018.

International Search Report dated Feb. 28, 2017 in PCT/JP2016/087510, filed Dec. 16, 2016.

* cited by examiner

FIG.9

| + UPLINK GRANT INDEX | |
|---|---|
| 1 | 1A |
| Carrier indicator | Carrier indicator |
| Resource allocation header (resource allocation type0/type1) | Flag for format0/format1A differentiation |
| | Localized/Distributed VRB assignment flag |
| Resource block assignment | Resource block assignment |
| Modulation and coding scheme | Modulation and coding scheme |
| HARQ process number | HARQ process number |
| New data indicator | New data indicator |
| Redundancy version | Redundancy version |
| TPC command for PUCCH | TPC command for PUCCH |
| Downlink Assignment Index | Downlink Assignment Index |
| | SRS request |
| HARQ-ACK resource offset | HARQ-ACK resource offset |
| UL grant index | UL grant index |

FIG.10

| + UPLINK GRANT INDEX + CHANNEL RESOURCE ASSIGNMENT INFORMATION | |
|---|---|
| 1 | 1A |
| Carrier indicator | Carrier indicator |
| Resource allocation header (resource allocation type0/type1) | Flag for format0/format1A differentiation |
| | Localized/Distributed VRB assignment flag |
| Resource block assignment | Resource block assignment |
| Modulation and coding scheme | Modulation and coding scheme |
| HARQ process number | HARQ process number |
| New data indicator | New data indicator |
| Redundancy version | Redundancy version |
| TPC command for PUCCH | TPC command for PUCCH |
| Downlink Assignment Index | Downlink Assignment Index |
| | SRS request |
| HARQ-ACK resource offset | HARQ-ACK resource offset |
| UL grant index | UL grant index |
| Frequency hopping flag | Frequency hopping flag |
| Resource block assignment and hopping resource allocation | Resource block assignment and hopping resource allocation |
| Resource allocation type | Resource allocation type |

FIG.11

| + UPLINK GRANT INDEX + GENERAL UPLINK GRANT INFORMATION | |
|---|---|
| 1 | 1A |
| Carrier indicator | Carrier indicator |
| Resource allocation header (resource allocation type0/type1) | Flag for format0/format1A differentiation |
| | Localized/Distributed VRB assignment flag |
| Resource block assignment | Resource block assignment |
| Modulation and coding scheme | Modulation and coding scheme |
| HARQ process number | HARQ process number |
| New data indicator | New data indicator |
| Redundancy version | Redundancy version |
| TPC command for PUCCH | TPC command for PUCCH |
| Downlink Assignment Index | Downlink Assignment Index |
| | SRS request |
| HARQ-ACK resource offset | HARQ-ACK resource offset |
| UL grant index | UL grant index |
| Frequency hopping flag | Frequency hopping flag |
| Resource block assignment and hopping resource allocation | Resource block assignment and hopping resource allocation |
| Resource allocation type | Resource allocation type |
| Modulation and coding scheme and redundancy version | Modulation and coding scheme and redundancy version |
| New data indicator | New data indicator |
| TPC command for scheduled PUSCH | TPC command for scheduled PUSCH |
| UL index | UL index |
| Downlink Assignment Index(DAI) | Downlink Assignment Index(DAI) |

FIG.12

| UPLINK GRANT INDEX | |
|---|---|
| 1 | 1A |
| UL grant index | UL grant index |

FIG.13

| + UPLINK GRANT INDEX + CHANNEL RESOURCE ASSIGNMENT INFORMATION | |
|---|---|
| 1 | 1A |
| UL grant index | UL grant index |
| Frequency hopping flag | Frequency hopping flag |
| Resource block assignment and hopping resource allocation | Resource block assignment and hopping resource allocation |
| Resource allocation type | Resource allocation type |

FIG.14

| + UPLINK GRANT INDEX + GENERAL UPLINK GRANT INFORMATION ||
|---|---|
| 1 | 1A |
| UL grant index | UL grant index |
| Frequency hopping flag | Frequency hopping flag |
| Resource block assignment and hopping resource allocation | Resource block assignment and hopping resource allocation |
| Resource allocation type | Resource allocation type |
| Modulation and coding scheme and redundancy version | Modulation and coding scheme and redundancy version |
| New data indicator | New data indicator |
| TPC command for scheduled PUSCH | TPC command for scheduled PUSCH |
| UL index | UL index |
| Downlink Assignment Index(DAI) | Downlink Assignment Index(DAI) |

BASE STATION EQUIPMENT,
COMMUNICATION TERMINAL,
COMMUNICATION SYSTEM, PROGRAM,
FRAME TRANSMITTING METHOD, AND
DATA STRUCTURE

CROSS-REFERENCE TO RELATED
APPLICATIONS

The present application is a continuation of U.S. application Ser. No. 16/073,120, filed Jul. 26, 2018, which is based on PCT filing PCT/JP2016/087510, filed Dec. 16, 2016, which claims priority to JP 2016-017946, filed Feb. 2, 2016, the entire contents of each are incorporated herein by reference.

TECHNICAL FIELD

The present technology relates to a communication system having base station equipment and a communication terminal. To be more specific, the present technology relates to a communication system in which data is sent back from the base station equipment to the communication terminal by the upper layer and a response signal indicative of the reception of this data is returned from the communication terminal to the base station equipment, a method of processing for these operations, a program for making a computer execute this processing method, and a data structure.

BACKGROUND ART

Currently, in 3GPP (Third Generation Partnership Project), the standardization of a LTE (Long Term Evolution) system is in progress as a next-generation mobile communication system. With this LTE system, transmitting data from a communication terminal to the base station equipment by uplink requires the acquisition of a channel in advance. Hence, the communication terminal transmits a scheduling request (SR) to the base station equipment. Receiving the scheduling request, the base station equipment executes scheduling of which channel to assign to the communication terminal, thereby notifying the communication terminal of the channel source assignment information. The communication terminal transmits data to the base station equipment on the basis of this assignment information. Such a scheduling scheme for channel resource assignment is called dynamic scheduling (refer to PTL 1 below, for example).

The dynamic scheduling as described above may sometimes be required for not only transmitting data by uplink but also for a sequence of transmitting data from the base station equipment to a communication terminal by downlink (refer to PTL 2 below, for example). For example, as with the transmitting, by uplink, of a successful reception (ACK) message for TCP data by downlink, the above-mentioned necessity applies to the case in which uplink traffic is included in the sequence of downlink traffic.

CITATION LIST

Patent Literature

[PTL 1]
JP 2011-228940A
[PTL 2]
WO 2011/100047A1

SUMMARY

Technical Problem

With the related-art technology described above, in a case where uplink traffic is included in the sequence of downlink traffic, uplink grant is acquired by dynamic scheduling in uplink, so that a time necessary for the grant acquisition causes an excess latency.

Therefore, the present technology has been produced in consideration of the situations described above and is intended to reduce latency and save processing time if an uplink traffic is included in a sequence of a downlink traffic.

Solutions to Problem

The present technology has been produced so as to solve the problems described above and according to a first aspect thereof, there are provided a communication apparatus, a processing method in this communication apparatus, and a program for having a computer execute this processing method. This communication apparatus has a frame generating block configured, if, after data is transmitted from an upper layer to another communication apparatus, a receive response signal of the above-mentioned data is required, to generate a predetermined frame that includes transmission grant information for the above-mentioned another communication apparatus to transmit the above-mentioned receive response signal and the above-mentioned data; and a transmitting block configured to transmit the above-mentioned generated frame to the above-mentioned another communication apparatus. This setup provides the function of reducing the latency for transmitting transmission grant information.

In this first aspect, the above-mentioned transmitting block may transmit the above-mentioned frame including the above-mentioned transmission grant information to the above-mentioned another communication apparatus without waiting for a scheduling request for requesting the above-mentioned transmission grant information from the above-mentioned another communication apparatus. This setup provides the function of reducing the latency due to the transmitting of transmission grant information after receiving the scheduling request.

Further, in this first aspect, the above-mentioned transmission grant information of the above-mentioned predetermined frame may include channel resource allocation information for transmitting the above-mentioned receive response signal. This setup provides the function of transmitting, in advance, a channel resource allocated for a receive response signal.

Still further, in this first aspect, the above-mentioned transmission grant information of the above-mentioned predetermined frame may include a transmission grant index that indicates use of, also next time, transmission grant information used immediately before for transmitting the above-mentioned receive response signal. This setup provides the function of letting the immediately preceding transmission grant information be used. In this case, a transmission grant information storage block configured to store the above-mentioned transmission grant information used immediately before may be further provided wherein, if the above-mentioned transmission grant index indicates use of, also next time, transmission grant information used immediately before for transmitting the above-mentioned receive response signal, the above-mentioned transmitting block transmits the above-mentioned generated frame by use of channel allocation information stored in the above-mentioned transmission grant information storage block. This setup provides the function of processing the stored channel allocation information as scheduling information, thereby using the scheduling information in a shared manner.

Yet further, in this first aspect, the above-mentioned upper layer may be a layer higher than a data link layer in an OSI reference model and a protocol of the above-mentioned upper layer may be any one of TCP, DCCP, STCCP, and ICMP.

Further, in this first aspect, the above-mentioned predetermined frame may include, as one control information format, information for receiving and decoding the above-mentioned data of a first communication link for the above-mentioned another communication apparatus and the above-mentioned transmission grant information of a second communication link for the above-mentioned another communication apparatus to transmit a receive response signal of the above-mentioned data. This setup provides the function of transmitting one control information format in one frame. On the other hand, in this first aspect, the above-mentioned predetermined frame may include, as one frame, a first control information format including information for receiving and decoding data of a first communication link for the above-mentioned another communication apparatus and a second control information format having the above-mentioned transmission grant information of a second communication link for the above-mentioned another communication apparatus to transmit a receive response signal of the above-mentioned data. This setup provides the function of transmitting two control information formats in one frame.

Still further, in this first aspect, the above-mentioned predetermined frame may include a payload including data of a first communication link for the above-mentioned another communication apparatus and a header including the above-mentioned transmission grant information of a second communication link for the above-mentioned another communication apparatus to transmit a receive response signal of the above-mentioned data. On the other than, the above-mentioned predetermined frame may include, as a payload, the above-mentioned data of a first communication link for the above-mentioned another communication apparatus and the above-mentioned transmission grant information of a second communication link for the above-mentioned another communication apparatus to transmit a receive response signal of the above-mentioned data.

A second aspect of the present technology is a program for having a computer execute a communication apparatus having a receiving block configured to receive a predetermined frame including data and transmission grant information for transmitting a receive response signal of the above-mentioned data from another communication apparatus by an upper layer and a transmitting block configured to transmit a receive response signal of the above-mentioned received data to the above-mentioned another communication apparatus in accordance with the above-mentioned transmission grant information and a processing method in the above-mentioned processing apparatus. This setup provides the function of reducing the latency in receiving transmission grant information.

Further, in this second aspect, the above-mentioned communication apparatus may further have a transmission grant information storage block configured to store the above-mentioned transmission grant information used immediately before in which the above-mentioned transmission grant information of the above-mentioned predetermined frame includes a transmission grant index for indicating use of, also next time, the above-mentioned transmission grant information used immediately before and, when the above-mentioned receiving block receives the above-mentioned transmission grant index, the above-mentioned transmitting block transmits a receive response signal of the above-mentioned received data to the above-mentioned another communication apparatus in accordance with the above-mentioned transmission grant information used immediately before stored in the above-mentioned transmission grant information storage block.

A third aspect of the present technology is a communication system having a first communication apparatus, if, after data is transmitted by an upper layer, a receive response signal of the above-mentioned data is required, having a frame generating block configured to generate a predetermined frame including transmission grant information for transmitting the above-mentioned receive response signal and a first transmitting block configured to transmit the above-mentioned generated frame; and a second communication apparatus having a receiving block configured to receive the above-mentioned predetermined frame from the above-mentioned first communication apparatus by the above-mentioned upper layer and a second transmitting block configured to transmit a receive response signal of the above-mentioned received data to the above-mentioned first communication apparatus in accordance with the above-mentioned transmission grant information. This setup provides the function of reducing the latency for transmitting transmission grant information from the first communication apparatus to the second communication apparatus.

A fourth aspect of the present technology is a data structure to be transmitted from a first communication apparatus to a second communication apparatus by an upper layer, the above-mentioned data structure including: data of a communication link for the above-mentioned second communication apparatus and transmission grant information for the above-mentioned second communication apparatus to transmit a receive response signal of the above-mentioned data. This setup provides the function of reducing the latency for separately transmitting transmission grant information by transmitting the data of the communication link for the second communication apparatus and the transmission grant information in one data structure.

Advantageous Effects of Invention

According to the present technology, excellent effects can be obtained that, in the case where the traffic of the reverse-directional second communication link is included in a sequence of the traffic of the first communication link from a communication apparatus to another communication apparatus, the latency can be reduced so as to save the processing time. It should be noted that the effects described here are not limited thereto; namely, any one of the effects cited in the present disclosure may be valid.

BRIEF DESCRIPTION OF DRAWINGS

FIG. 9 is a diagram illustrating a first type of a first format of a DCI format in one embodiment of the present technology.

FIG. 10 is a diagram illustrating a second type of the first format of the DCI format in one embodiment of the present technology.

FIG. 11 is a diagram illustrating a third type of the first format of the DCI format in one embodiment of the present technology.

FIG. 12 is a diagram illustrating a first type of a second format of the DCI format in one embodiment of the present technology.

FIG. 13 is a diagram illustrating a second type of the second format of the DCI format in one embodiment of the present technology.

FIG. 14 is a diagram illustrating a third type of the second format of the DCI format in one embodiment of the present technology.

DESCRIPTION OF EMBODIMENTS

The following describes modes (hereafter referred to as embodiments) for practicing the present technology. The description will be done in the following sequence.

1. System configuration
2. Frame configuration
3. Operations

<1. System Configuration>
[Overall Configuration of Communication Network]

Figure 1:
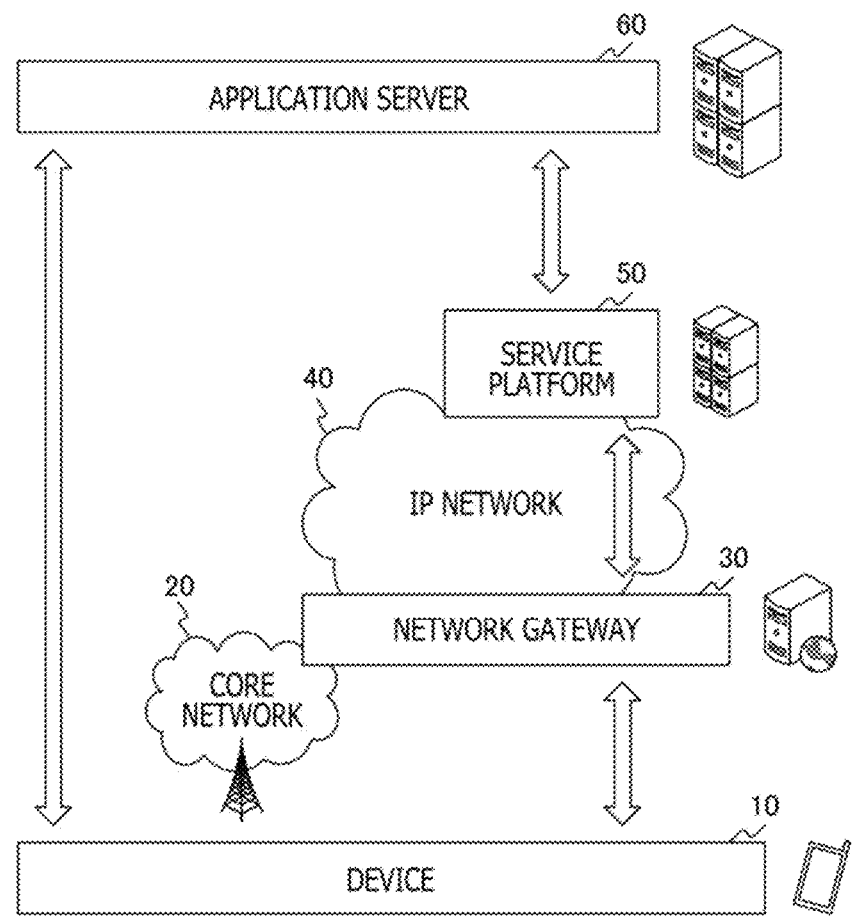
FIG. 1 is a diagram illustrating one example of an overall configuration of a communication network in one embodiment of the present technology.

FIG. 1 depicts a diagram illustrating one example of an overall configuration of a communication network in one embodiment of the present technology.

A device layer 10 is a layer of a communication apparatus for executing wireless communication. This device layer 10 includes not only a communication terminal but also an communication apparatus having a wireless communication function such as base station equipment. It is also practicable to divide a communication terminal and base station equipment into different layers. In this case, it is desirable to arrange the base station equipment near a core network 20. In 3GPP, the communication terminal is sometimes referred to as a UE (User Equipment) and the base station equipment as an eNB (evolved Node B). Further, the base station equipment not only includes the eNB but also an NB (Node B) and an access point.

In this example, the case is assumed that the services provided by an application server 60 be used by a communication terminal belonging to the device layer 10 via a network. For a logical session, a transaction between a communication terminal and the application server 60 may be taken.

On the other hand, if the logical session is taken as the connection of the network layer, a network configuration can be further taken in addition to the logical session. For example, if the communication apparatus of the device layer 10 includes a cellar system, one or more units of base station equipment are connected to a cellar system control/user data network called a core network 20. Then, via a network gateway 30 inside the core network 20, the base station equipment is connected to a public IP (Internet Protocol) network 40.

Further, the application server 60 may be taken as one component including a service platform 50 along with two or more other servers like a cloud system, for example. Also in such a case, a communication apparatus equivalent to a gateway may be arranged on the side of the service platform 50 so as to obtain the function of connection with the IP network 40.

The core network 20, the IP network 40, and the service platform 50 may be internally configured by further physical communication apparatuses. For example, such virtualization apparatuses for virtualize a network as a router, a switch, and a router switch, and a network virtualization control apparatus and a cable are assumed.

A wireless access technology (RAT: Radio Access Technology) in one embodiment of the present technology is especially a technology for realizing the wireless connection between the communication apparatuses belonging to the device layer 10. The traffic from the base station equipment to the communication terminal is referred to as downlink (down) and the traffic from the communication terminal to the base station equipment is referred to as uplink (up). It should be noted that the downlink and the uplink are one example of the communication links cited in the scope of claims.

Figure 2:
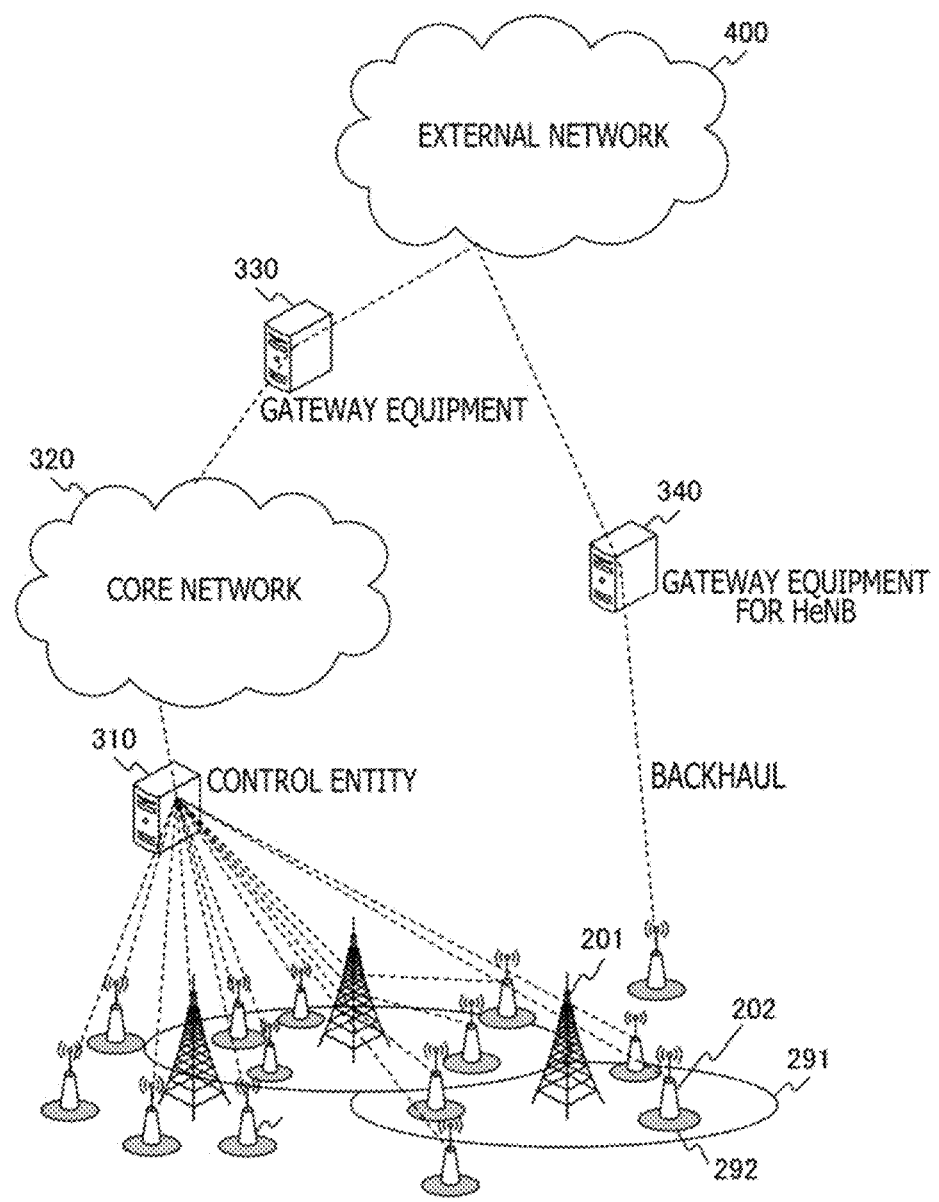
FIG. 2 is a diagram illustrating one example of an overall configuration of another communication network in one embodiment of the present technology.

FIG. 2 depicts a diagram illustrating one example of an overall configuration of another communication network in one embodiment of the present technology. With this communication network, network configurations including heterogeneous HetNet (Heterogeneous Network) and an SCE (Small Cell Enhancement) network including small cells are assumed. In this diagram, the lines indicated with dashed lines denote logical connection and therefore are not always physically directly connected with each other.

A communication area is configured by two or more base station equipment units 201 and 202 and cell areas 291 and 292 to which these base station equipment units provide services. The base station equipment 201 of macro cell provides the cell area 291 of macro cell and the base station equipment 202 of small cell provides the cell area 292 of small cell. It should be noted that one unit of the base station equipment may provide two or more cell areas.

The base station equipment units 201 and 202 are communicable with each other via a backhaul regardless of wired or wireless manner among the base station equipment units, thereby mainly transferring control information. For this backhaul, the transfer of information by use of an X2 interface or S1 interface protocol, for example, may be employed. Backhaul topology may be employed any shapes such as mesh, star, ring or the like.

Further, the base station equipment units 201 and 202 also have a backhaul with a core network 320 of the system. In this case, the core network 320 may be connected through connection with a control entity 310. That is, the control entity 310 may be taken as one component of the core network 320. Also, the base station equipment units 201 and 202 may be connected to the core network via an external network 400 in addition to via the control entity 310. In this case, femtocell base station equipment or HeNB (Home eNode) equipment that can be installed in a room or home apply, for example. In this case, a gateway apparatus 330 is arranged for the external network 400 and a gateway apparatus 340 is arranged for the HeNB.

The cell area 292 of the small cell is basically arranged so as to be superimposed on a cell area 291 of the macro cell. However, in addition thereto, the cell area 292 may be arranged partially or totally outside the cell area 291.

The macro cell and the small cell may have features in the wireless resources to be used. For example, the macro cell and the small cell may use the same frequency resource F1 (or time resource T1). This setup allows the enhancement in the wireless resource usage efficiency as an entire system. On the other hand, it is also practicable that the macro cell uses frequency resource F1 (or time resource T1) and the small cell uses frequency resource F2 (or time resource T2). This setup allows the avoidance of the interference between the micro cell and the small cell. Further, each of both types of cells may use both frequency resources F1 and F2 (or time resources T1 and T2). This provides the same concept as carrier aggregation (CA) especially if applied to frequency resources.

[Communication Layers]

Figure 3:
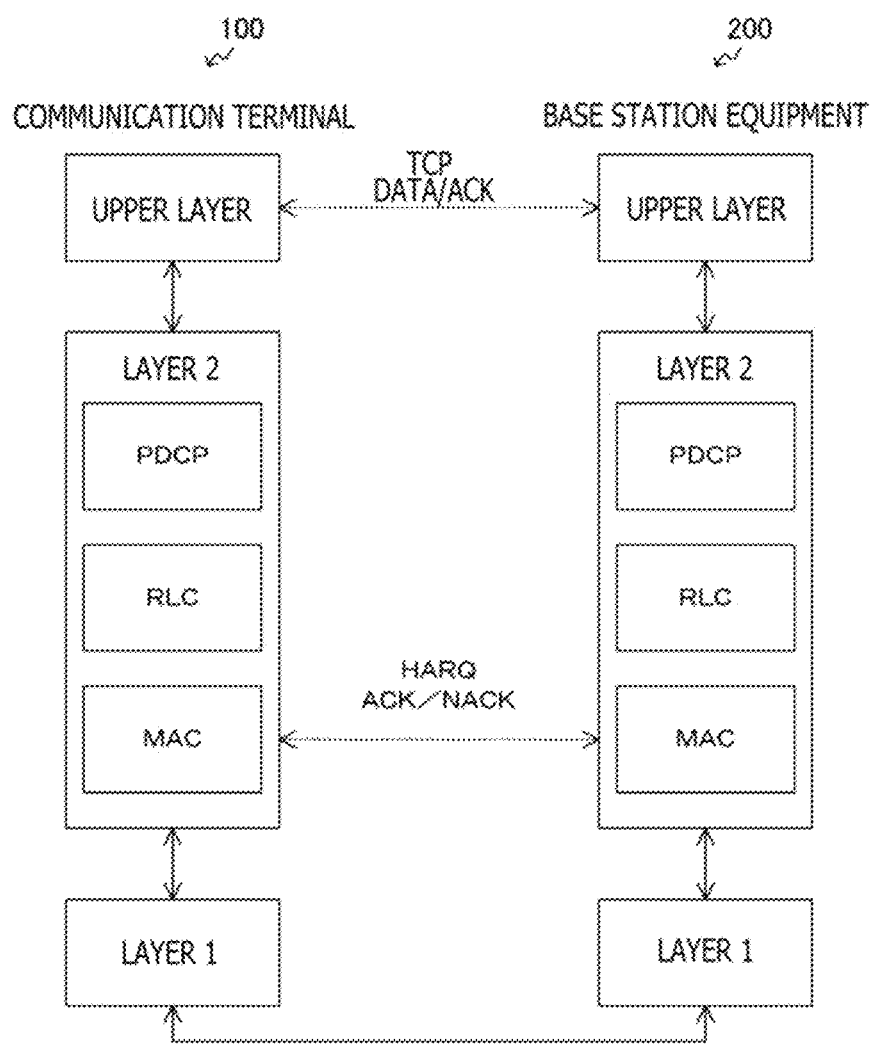
FIG. 3 is a diagram illustrating one example of a communication layer configuration in one embodiment of the present technology.

FIG. 3 depicts a diagram illustrating one example of a communication layer configuration in one embodiment of the present embodiment. Here, the wireless communication between the communication terminal 100 and the base station equipment 200 is assumed, indicating a layer 1, a layer 2, and an upper layer as communication layers. The layer 1 is the physical layer in the OSI reference model and specifies a physical transmission protocol of a network. The layer 2 is the data link layer in the OSI reference model and requests the layer 1 for services in accordance with a request from an upper layer. It should be noted that the communication terminal 100 and the base station equipment 200 are examples of the communication apparatuses cited in the scope of claims.

In this example, the layer 2 includes sub layers; a PDCP (Packet Data Convergence Protocol) layer, an RLC (Radio Link Control) layer, and an MAC (Medium Access Control) layer. In the MAC layer, error correction by HARQ (Hybrid Automatic Repeat reQuest) is executed. That is, if an error occurs in the layer 1, the error is corrected by retransmission control in this MAC layer. It should be noted that HARQ is a packet retransmission control technology with forward error correction (FEC) and automatic repeat request (ARQ) combined.

In downlink, asynchronous HARQ is employed in which ACK or NACK is transmitted by PUCCH (Physical Uplink Control Channel) or PUSCH (Physical Uplink Shared Channel). At this time, retransmission control is scheduled by PDCCH (Physical Downlink Control Channel). On the other hand, in uplink, synchronous HARQ is employed and ACK or NACK is transmitted by PHICH (Physical Hybrid-ARQ Indicator Channel).

The upper layer is arranged higher than the data link layer in the OSI reference mode and includes the network layer, the transport layer, and the application layer, for example. For the transport layer, TCP (Transmission Control Protocol), DCCP (Datagram Congestion Control Protocol), STCP (Stream Transmission Control Protocol), and so on, are supposed as target protocols. The target message type in this case is ACK. For the network layer, ICMP (Internet Control Message Protocol) and so on are supposed as a target protocol. For the message type in this case, an echo reply message (ping), a time stamp reply message, an information reply message, an address mask reply message, and so on, are supposed.

In what follows, data transmission and the replay of a response signal (an ACK message) by TCP are supposed. When data is transmitted by TCP in downlink from the base station equipment 200 to the communication terminal 100, the communication terminal 100 must reply an ACK signal by TCP. This ACK signal is transmitted in the uplink from the communication terminal 100 to the base station equipment 200 by the TCP of the upper layer. Therefore, along with the transmission of the ACK signal of the TCP, an ACK signal by the HARQ of the layer 2 is transmitted from the base station equipment 200 to the communication terminal 100.

[Basic Sequence]

Figure 4:
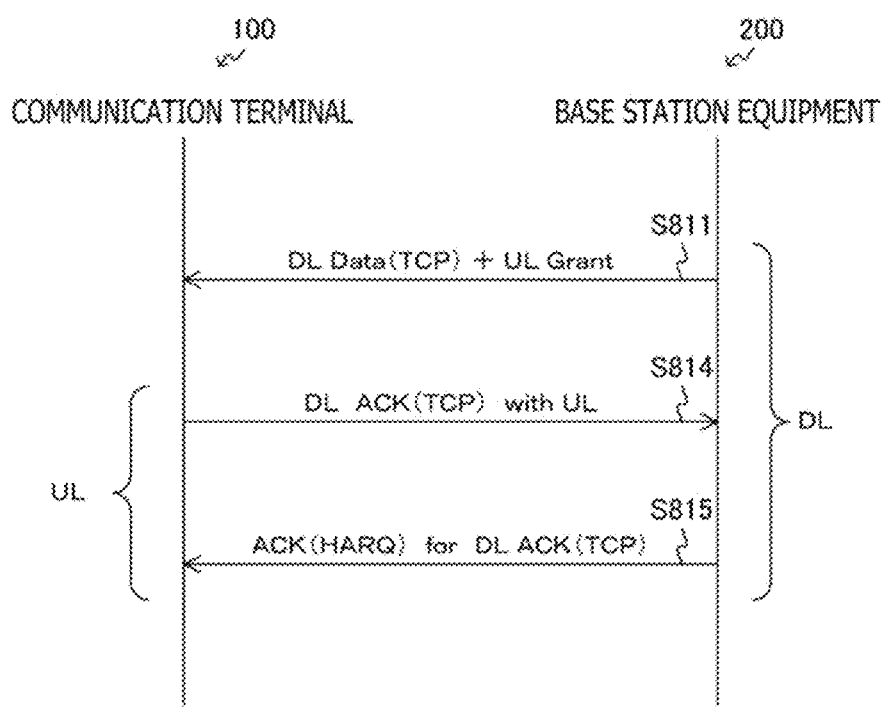
FIG. 4 is a diagram illustrating one example a basic sequence between a communication terminal 100 and base station equipment 200 in one embodiment of the present technology.

FIG. 4 depicts a diagram illustrating one example of a basic sequence between the communication terminal 100 and the base station equipment 200 in one embodiment of the present technology. In this embodiment, the transmission of an ACK signal by uplink to TCP data by downlink is supposed, thereby transmitting uplink grant information for ACK reply as a piggyback along with the TCP data of downlink. This uplink grant information is allocation information for allocating, to the communication terminal 100, the channel resource for returning the ACK signal by uplink. Details of this uplink grant information will be described later, the detail information related with the allocated channel resource may be transmitted or only the information indicative of the use of the immediately preceding information may be transmitted.

Here, the base station equipment 200 first transmits the TCP data by downlink and the uplink grant information for ACK return (step S811). In the related-art technology, the uplink grant information is not transmitted with this timing. Only TCP data is transmitted by downlink and then uplink grant information is transmitted from the base station equipment in accordance with as scheduling request from the communication terminal. By contrast, in the present embodiment, the uplink grant information for ACK return can be transmitted along with the TCP data of downlink, thereby reducing latency to shorten processing time.

In accordance with the uplink grant information, the communication terminal 100 that has received TCP data by downlink returns the ACK signal of TCP to the base station equipment 200 by uplink (step S814).

The base station equipment 200 that has received the ACK signal of TCP executes retransmission control by the HARQ of the layer 2 and, if no error is found, transmits the ACK signal to the communication terminal 100 (step S815).

[Configuration of Communication Terminal]

Figure 5:
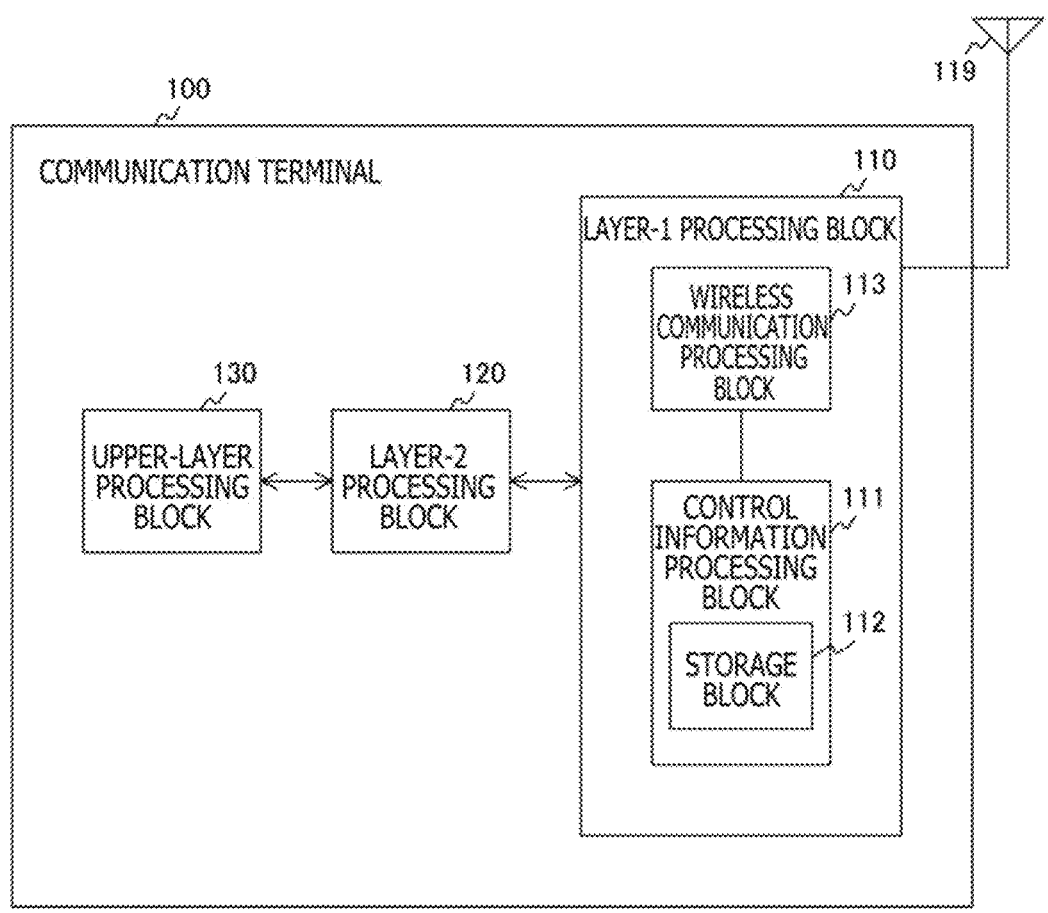
FIG. 5 is a diagram illustrating one example of a configuration of the communication terminal 100 in one embodiment of the present technology.

FIG. 5 depicts a diagram illustrating one example of a configuration of the communication terminal 100 in one embodiment of the present technology. This communication terminal 100 includes a layer-1 processing block 110, a layer-2 processing block 120, and an upper-layer processing block 130. The layer-1 processing block 110 executes the processing related with the layer 1. The layer-2 processing block 120 executes the processing related with the layer 2. The upper-layer processing block 130 executes the processing related with the upper layer.

The layer-1 processing block 110 includes a control information processing block 111 and a wireless communication processing block 113. The control information processing block 111 executes the control of the processing in the layer 1. This control information processing block 111 includes a storage block 112. This storage block 112 stores the information necessary for the control of the processing in layer, for example, storing the allocation information of channel resources allocated to the communication terminal 100. It should be noted that the storage block 112 is one example of the transmission grant information storage block cited in the scope of claims.

The wireless communication processing block 113 executes wireless communication processing with the base station equipment 200 and so on via an antenna 119. It should be noted that the wireless communication processing block 113 is one example of the receiving block cited in the scope of claims.

The control information processing block 111 of the layer-1 processing block 110 determines whether or not the frame of the received TCP data includes uplink grant information. If the uplink grant information is found, on the basis of this uplink grant information, the control information processing block 111 determines whether or not the information to be updated is stored in the storage block 112. If the information to be updated is found, the control information processing block 111 updates the storage block 112 by the uplink grant information and, on the basis of this data, the wireless communication processing block 113 returns the ACK signal of TCP for the TCP data to the base station equipment 200.

If the storage block 112 is found not storing the immediately preceding uplink grant information, the control information processing block 111 is determined to execute the processing of acquiring the uplink grant information from the base station equipment 200 by the normal scheduling scheme. The uplink grant information acquired from the base station equipment 200 is stored in the storage block 112. It should be noted that the control information processing block 111 is one example of the transmitting block or the second transmitting block cited in the scope of claims.

[Configuration of Base Station Equipment]

Figure 6:
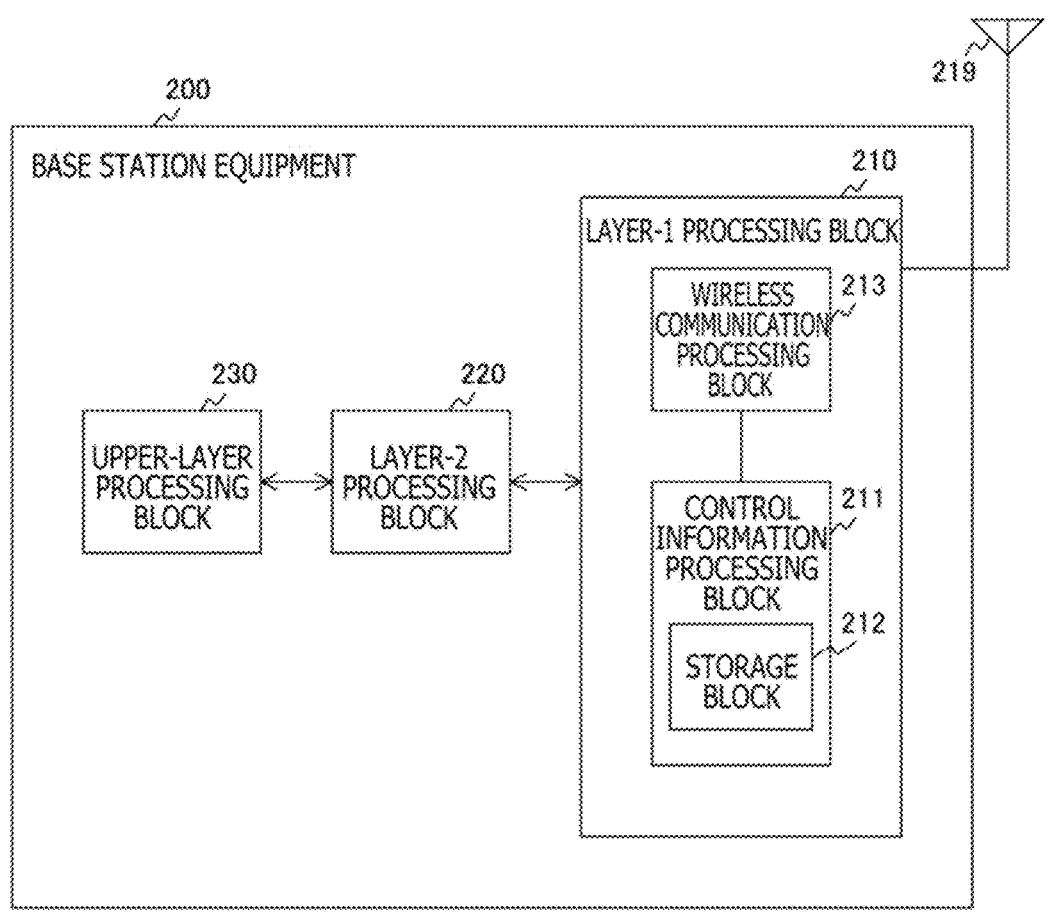
FIG. 6 is a diagram illustrating one example of a configuration of the base station equipment 200 in one embodiment of the present technology.

FIG. 6 depicts a diagram illustrating one example of a configuration of the base station equipment 200 in one embodiment of the present technology. As with the communication terminal 100, this base station equipment 200 includes a layer-1 processing block 210, a layer-2 processing block 220, and an upper-layer processing block 230. The layer-1 processing block 210 executes the processing related with the layer 1. The layer-2 processing block 220 executes the processing related with the layer 2. The upper-layer processing block 230 executes the processing related with the upper layer.

The layer-1 processing block 210 includes a control information processing block 211 and a wireless communication processing block 213. The control information processing block 211 executes the control of the processing in the layer 1. This control information processing block 211 includes a storage block 212. This storage block 212 stores the information necessary for the control of the processing of the layer 1, for example, storing the allocation information of channel resources allocated to the communication terminal 100. The wireless communication processing block 213 executes wireless communication processing with the communication terminal 100 and so on via an antenna 219. It should be noted that the wireless communication processing block 213 is one example of the transmitting block or the first transmitting block cited in the scope of claims.

The control information processing block 211 of the layer-1 processing block 210 determines whether or not a data symbol to be transmitted is required to return an ACK like TCP data. If the data symbol is found required to return an ACK, the control information processing block 211 determines the uplink grant information such as the channel resource allocation for the ACK signal of TCP to be returned by the uplink and puts the determined uplink grant information on the frame. Further, the control information processing block 211 stores this uplink grant information in the storage block 212.

The control information processing block 211 determines whether or not the immediately preceding uplink grant information is stored in the storage block 212. If the immediately preceding uplink grant information is found stored in the storage block 212, the uplink grant information can be taken from the storage block 212 to be put on the frame. On the other hand, if the uplink grant information is not found stored in the storage block 212, the uplink grant information is determined by a normal scheduling scheme. It should be noted that the control information processing block 211 is one example of the frame generating block cited in the scope of claims.

<2. Frame Configuration>

In one embodiment of the present technology, one example is depicted in which, in the frame of the layer 1 (physical layer PHY) of the next-generation mobile communication system LTE of 3GPP, uplink grant information is transmitted along with TCP data.

[Layer-1 Frame Configuration]

Figure 7:
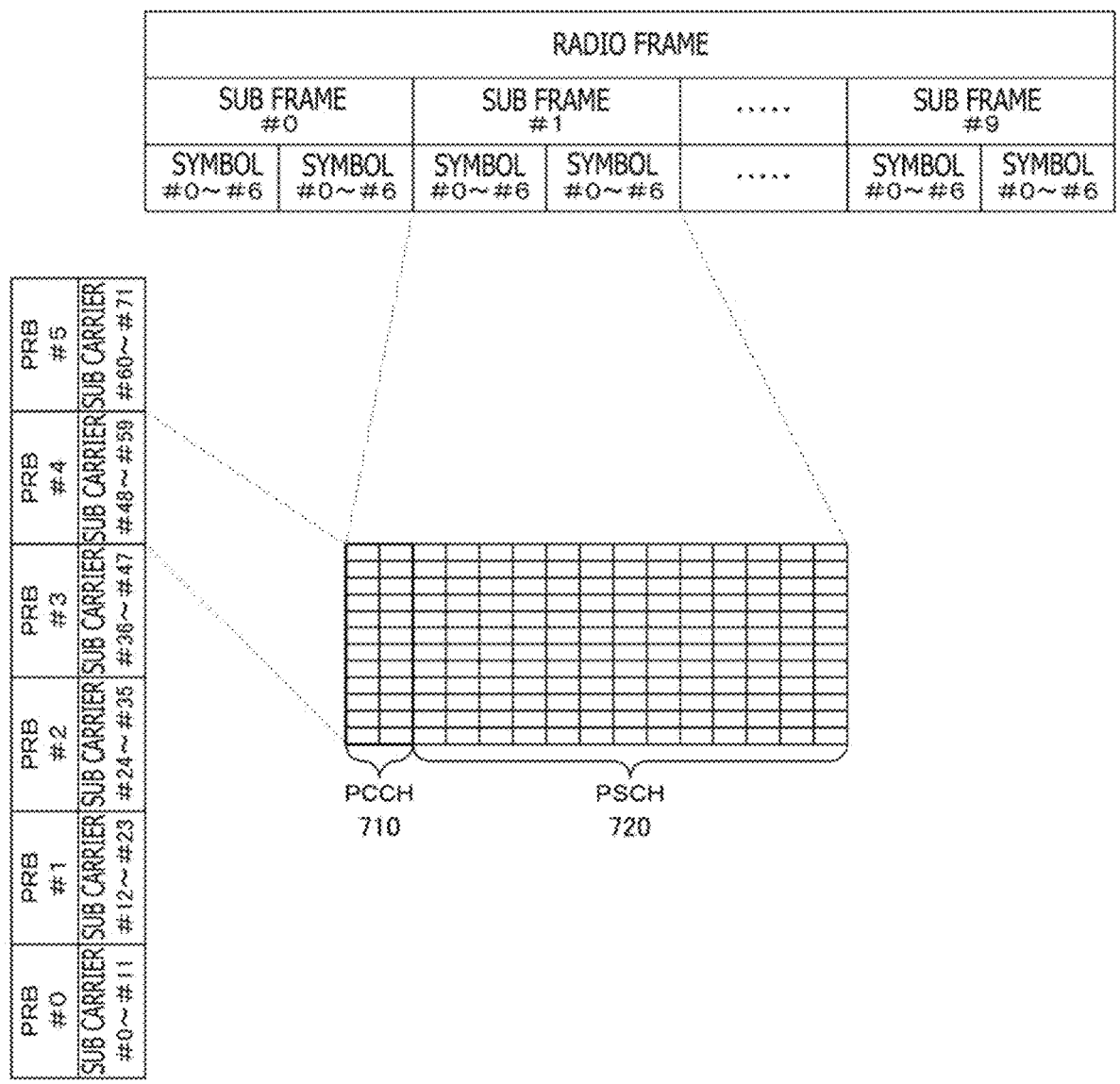
FIG. 7 is a diagram illustrating one example of a frame configuration of a layer 1 in one embodiment of the present technology.

FIG. 7 depicts a diagram illustrating one example of a frame configuration of the layer 1 in one embodiment of the present technology. The radio frame of the layer 1 is transmitted as mapped in the time direction and the frequency direction. One radio frame is allocated to ten sub-carriers. One subcarrier has two slots, each slot including seven symbols. PRB (Physical Resource Block) is the time frequency resources allocation unit. In this example, 72 subcarriers are allocated to six PRBs.

A PCCH (Physical Control Channel) 710 is indicative of a physical control channel. A PSCH (Physical Shared Channel) 720 is indicative of a physical shared channel. In the frame of the layer 1, the PCCH 710 is equivalent to a PHY header, while the PSCH 720 is equivalent to a PHY payload.

Figure 8:
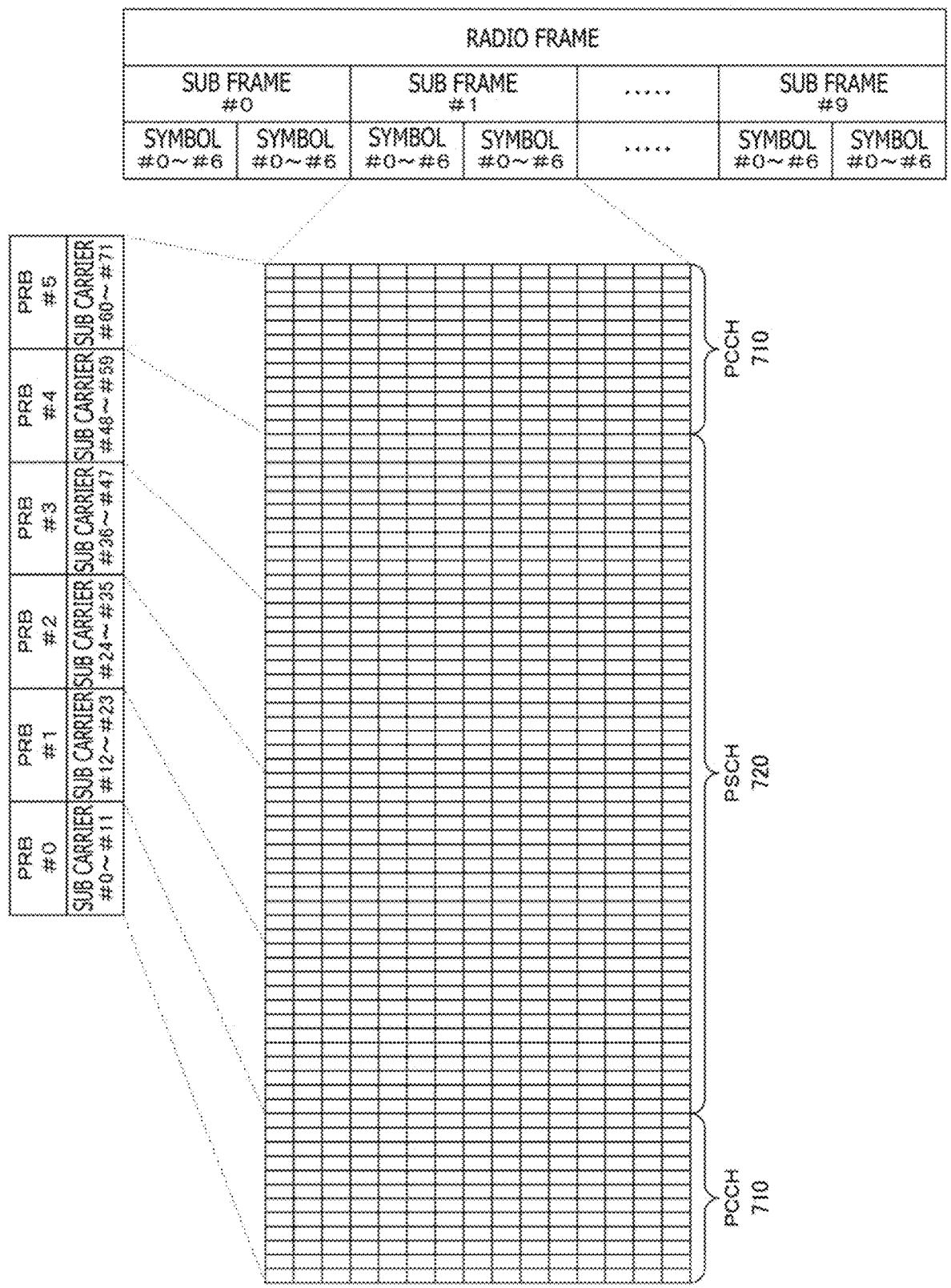
FIG. 8 is a diagram illustrating another example of a frame configuration of the layer 1 in one embodiment of the present technology.

FIG. 8 depicts another example of the frame configuration of the layer 1 in one embodiment of the present technology. In this example, the positions of the PCCH and the PSCH are different from those depicted in the example of FIG. 7, the PCCH being arranged at both ends of the frequency axis. In the example depicted in FIG. 8, like the example depicted in FIG. 7, the PCCH is equivalent to the PHY header, while the PSCH is equivalent to the PHY payload, in the frame of the layer 1.

In FIG. 7 and FIG. 8, the PCCH may be representative of a physical downlink control channel (PDCCH). The PSCH may be representative of a physical downlink shared channel (PDSCH).

At this time, a DL-SCH (Downlink Shared Channel) is mapped to the PDSCH. This DL-SCH is indicative of the downlink shared channel that is a transport channel. On the other hand, DCI (Downlink Control Information) is mapped to the PDCCH. That is, to the PDSCH, a transport block including the TCP data from the upper layer is mapped; to the PDCCH, DCI including the uplink grant information for returning ACK of TCP for this TCP data is mapped. As a result, the uplink grant information for returning TCP data and the ACK for this TCP data can be transmitted in one PHY frame.

Further, in FIG. 7 and FIG. 8, the PCCH may be indicative of a physical uplink control channel (PUCCH). Also, the PSCH may be indicative of a physical uplink shared channel (PUSCH).

At this time, a UL-SCH (Uplink Shared Channel) is mapped to the PUSCH. This UL-SCH is indicative of the uplink shared channel that is a transport channel. On the other hand, UCI (Uplink Control Information) is mapped to the PUCCH. That is, to the PUSCH, a transport block including the TCP data from the upper layer is mapped; to the PUCCH, UCI including the downlink grant information for returning ACK of TCP for this TCP data is mapped.

[DCI Format]

In one embodiment of the present technology, the case in which a new DCI format added with uplink grant information to the general downlink DCI format is arranged and the case in which a new DCI format independently having uplink grant information is arranged are supposed.

In addition, three types are supposed for each of these cases depending on the contents of the information to be transmitted. The first type has, as uplink grant information, an uplink grant index for specifying the use of the immediately preceding uplink grant information. The second type has, as uplink grant information, channel resource allocation information in addition to the uplink grant index. The third type has general uplink grant information in addition to the uplink grant index. This general uplink grant information includes the channel resource allocation information. The uplink grant information in one embodiment of the present technology is a concept that is wider than that of the general uplink grant information and includes the uplink grant index.

It should be noted that the uplink grant information is one example of the transmission grant information cited in the scope of claims. Further, the uplink grant index is one example of the transmission grant index cited in the scope of claims. Still further, the DCI format is one example of the control information format cited in the scope of claims.

In what follows, an example in which one embodiment of the present technology is applied to "format 1" and "format 1A" of the DCI format is indicated. However, it is also practicable to apply one embodiment of the present technology to other formats.

FIG. 9 depicts a diagram illustrating the first type of the first format of the DCI format in one embodiment of the present technology.

"Carrier indicator" is indicative of the information related with cell in the case where carrier aggregation is used. "Flag for format 0/format1A differentiation" is a flag indicative of "format 0" or "format 1A." "Localized/Distributed VRB assignment flag" is a flat indicative whether VRB (Virtual Resource Block) is localized or distributed. "Resource allocation header" is a header indicative of the type of subsequent "Resource block assignment." "Resource block assignment" is indicative of the information related with the assignment of resource block. "Modulation and coding scheme" is indicative of the information related with schemes of modulation and coding. "HARQ process number" is indicative of the process number of HARQ. "New data indicator" is indicative of whether the assigned downlink resource is for new data or retransmission. "Redundancy version" is indicative of the information related with a puncturing pattern applied to a transport block. "TPC command for PUCCH" is indicative of the information related with the transmission power of PUCCH. "Downlink Assignment Index" is indicative of the multiplicity in the case where the time division duplex scheme (TDD) is used. "SRS request" is indicative of the information for requesting for SRS (Sounding Reference Signal) in the case where DCI is mapped to PDCCH. "HARQ-ACK resource offset" is indicative of the information related with the offset of HARQ-ACK resource index. The items of information described so far are the items of information that are included in the general DCI format, the items of information that are used for transmitting, receiving, and decoding data.

"UL grant index" is the information newly provided in one embodiment of the present technology for indicating whether or not to use the immediately preceding uplink grant information. Here, if the use of the immediately preceding uplink grant information is indicated, the communication terminal 100 returns the ACK of TCP by use of the channel resource allocation information of the uplink grant information stored in the storage block 112.

FIG. 10 depicts a diagram illustrating one example of the second type of the first format of the DCI format in one embodiment of the present technology. The DCI format of this example has the following information in addition to the above-mentioned example of the first type.

"Frequency hopping flag" is a flag indicative whether or not frequency hopping is to be executed. "Resource block assignment and hopping resource allocation" is indicative of the information related with the assignment of resource block and the allocation of the resource of frequency hopping. "Resource allocation type" is indicative of the type of resource allocation.

These items of information are the channel resource allocation information of uplink for returning an ACK signal. If the uplink grant information is stored in the storage block 112, only these items of channel resource allocation information may possibly be updated.

FIG. 11 depicts a diagram illustrating one example of the third type of the first format of the DCI format in one embodiment of the present technology. The DCI format of this example has the following information in addition to the above-mentioned example of the second type.

"Modulation and coding scheme and redundancy version" is indicative of the information related with a puncturing pattern to be applied to modulation and coding scheme and transport block. "New data indicator" is indicative of whether the allocated downlink resource is for new data or retransmission. "TPC command for scheduled PUSCH" is indicative of the information related with the transmission power of PUSCH. "UL index" is indicative of the information related with transmission timing of uplink in the case where "TDD configuration 0" is used in time division duplex (TDD). "Downlink Assignment Index (DAI)" is the control information of the time division duplex (TDD) in the DCI format for downlink. For example, this is indicative of the information that is used to determine whether or not such TDD downlink allocation information (DCI) as the number of sub frames required by HARQ is lost, for example.

The information obtained by adding the above-mentioned items of information to the above-mentioned channel resource allocation information is the general uplink grant information. The uplink grant information in one embodiment of the present technology is obtained by adding the uplink grant index to this general uplink grant information and these pieces of information are stored in the storage blocks 112 and 211.

FIG. 12 depicts a diagram illustrating one example of the first type of the second format of the DCI format in one embodiment of the present technology. This DCI format of the second format is configured without including the information for receiving and decoding the data in the first format.

The DCI format of this example is configured only by "UL grant index." "UL grant index" is similar to the above-mentioned case of the first format, the uplink grant index indicative of whether or not to use the uplink grant information used immediately before.

FIG. 13 depicts a diagram illustrating one example of the second type of the second format of the DCI format in one embodiment of the present technology.

The DCI format of this example is configured by "Frequency hopping flag," "Resource block assignment and hopping resource allocation," and "Resource allocation type" in addition to "UL grant index." These are channel resource allocation information and the contents of each of these items are similar to those of the above-mentioned first format.

FIG. 14 depicts a diagram illustrating one example of the third type of the second format of the DCI format in one embodiment of the present technology.

The DCI format of this example is configured by "Modulation and coding scheme and redundancy version," "New data indicator," "TPC command for scheduled PUSCH," "UL index," and "Downlink Assignment Index (DAI)" in addition to the second type. The contents of each of these items are similar to those of the above-mentioned first type.

It should be noted that, in the embodiment described above, the uplink grant information is transmitted as stored in the DCI format by the PHY header and the data is transmitted by the PHY payload, however, it is also practicable to transmit the uplink grant information by any other formats. For example, the uplink grant information may be transmitted along with data by the PHY payload.

<3. Operations>
[Operation Sequence]

Figure 15:
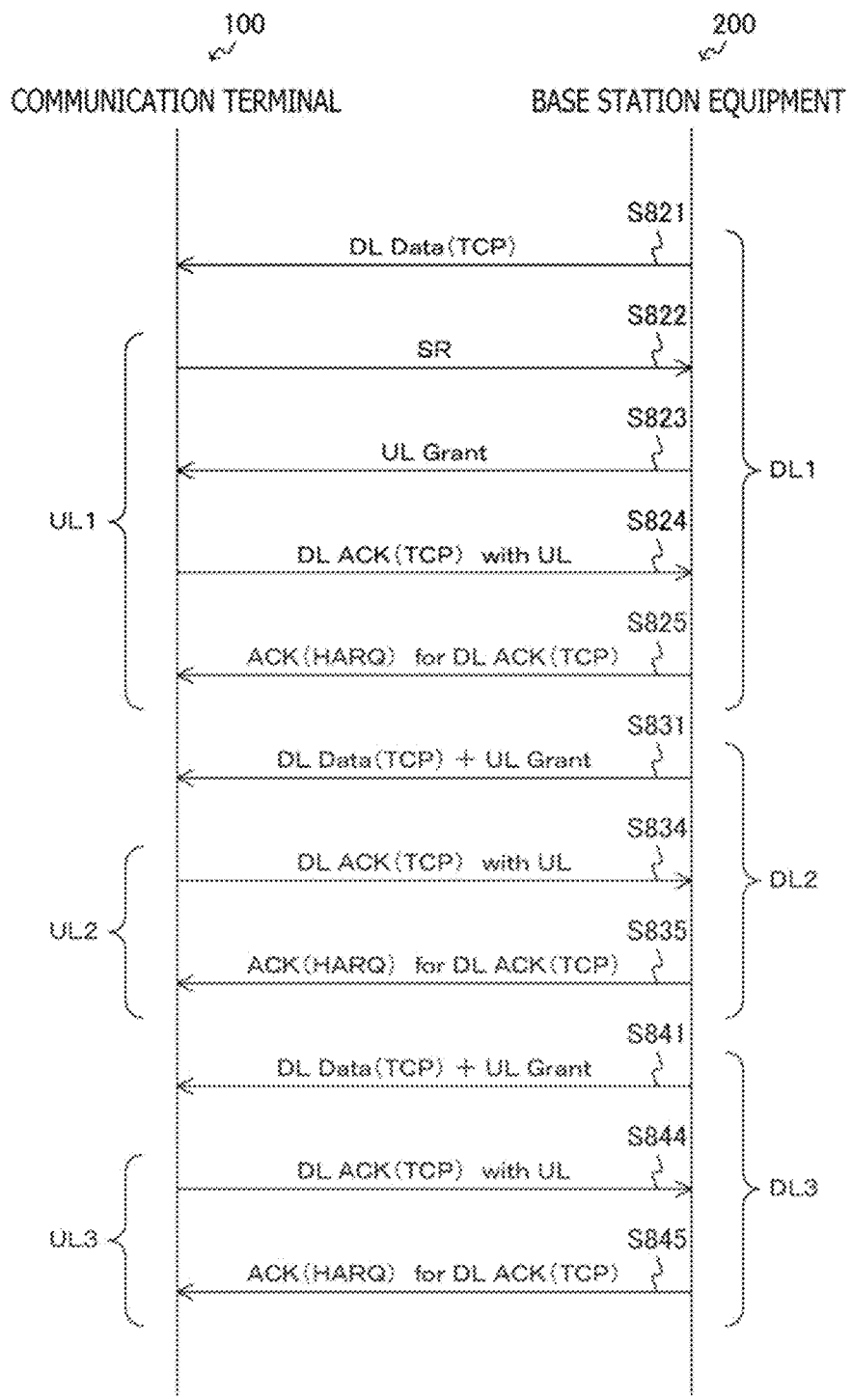
FIG. 15 is a sequence chart indicative of a first example of an operation sequence between the communication terminal 100 and the base station equipment 200 in one embodiment of the present technology.

FIG. 15 depicts a sequence chart illustrating a first example of an operation sequence between the communication terminal 100 and the base station equipment 200 in one embodiment of the present technology. This first example assumes that an operation starts from a state in which the uplink grant information is not stored in the storage block 212 of the base station equipment 200.

Here, since the base station equipment 200 has no uplink grant information in the storage block 212, the base station equipment 200 transmits TCP data without including uplink grant information by downlink (step S821). In response, the communication terminal 100 transmits a scheduling request to the base station equipment 200 (step S822). In response to this scheduling request, the base station equipment 200 executes channel resource allocation and stores the uplink grant information into the storage block 212, thereby transmitting this uplink grant information to the communication terminal 100 (step S823). The communication terminal 100 stores this uplink grant information into the storage block 112 and, at the same time, transmits an ACK signal for the TCP data of downlink by uplink on the basis of this uplink grant information (step S824). The base station equipment 200 transmits an ACK signal of the layer 2 for the ACK signal of TCP to the communication terminal 100 by the retransmission control by HARQ (step S825).

Next, the base station equipment 200 transmits the TCP data by downlink along with the uplink grant information stored in the storage block 212 (step S831). On the basis of this uplink grant information, the communication terminal 100 transmits an ACK signal for the TCP data of downlink by uplink (step S834). The base station equipment 200 transmits an ACK signal of the layer 2 for the ACK signal of TCP to the communication terminal 100 by the retransmission control by HARQ (step S835).

In what follows, similar processing as above will be executed, in which the base station equipment 200 transmits the TCP data along with the uplink grant information stored in the storage block 212 by uplink (step 841) and on the basis of this uplink grant information, an ACK signal is returned (step S844).

Figure 16:
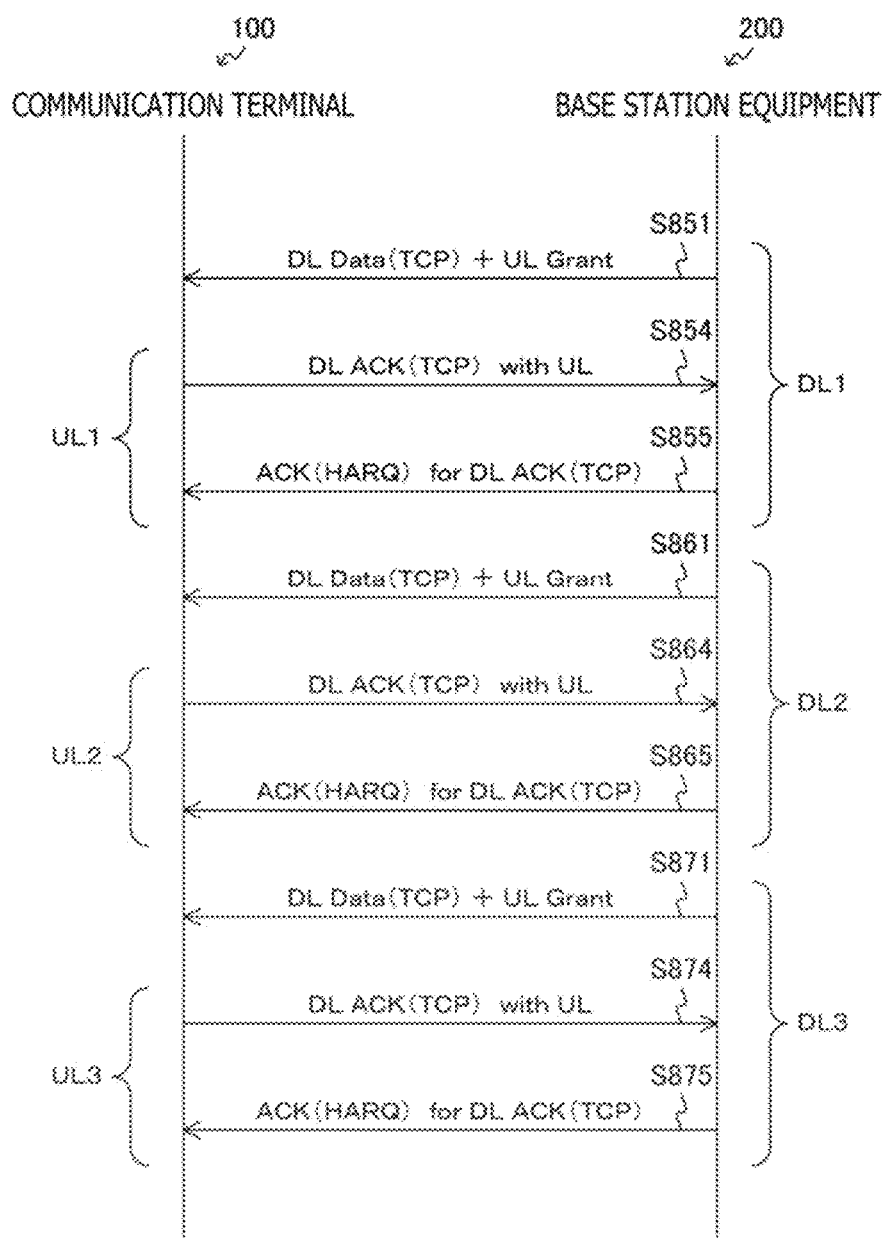
FIG. 16 is a sequence chart indicative of a second example of an operation sequence between the communication terminal 100 and the base station equipment 200 in one embodiment of the present technology.

FIG. 16 depicts a sequence chart illustrating the second example of the operation sequence between the communication terminal 100 and the base station equipment 200. This second example assumes that an operation starts from a state in which the uplink grant information is stored beforehand in the storage block 212 of the base station equipment 200.

Here, since the base station equipment 200 stores uplink grant information in the storage block 212, the base station equipment 200 transmits TCP data along with the uplink grant information stored in the storage block 212 by downlink (step S851). In response, the communication terminal 100 transmits an ACK signal for the TCP data of downlink on the basis of this uplink grant information by uplink (step S854). Then, the base station equipment 200 transmits an ACK signal of the layer 2 for the ACK signal of TCP to the communication terminal 100 by the retransmission control by HARQ (step S855).

In what follows, similar processing as above will be executed, in which the base station equipment 200 transmits the TCP data along with the uplink grant information stored in the storage block 212 (steps 861, S871) and on the basis of this uplink grant information, an ACK signal is returned (steps S864 and S874).

[Processing Procedure]

Figure 17:
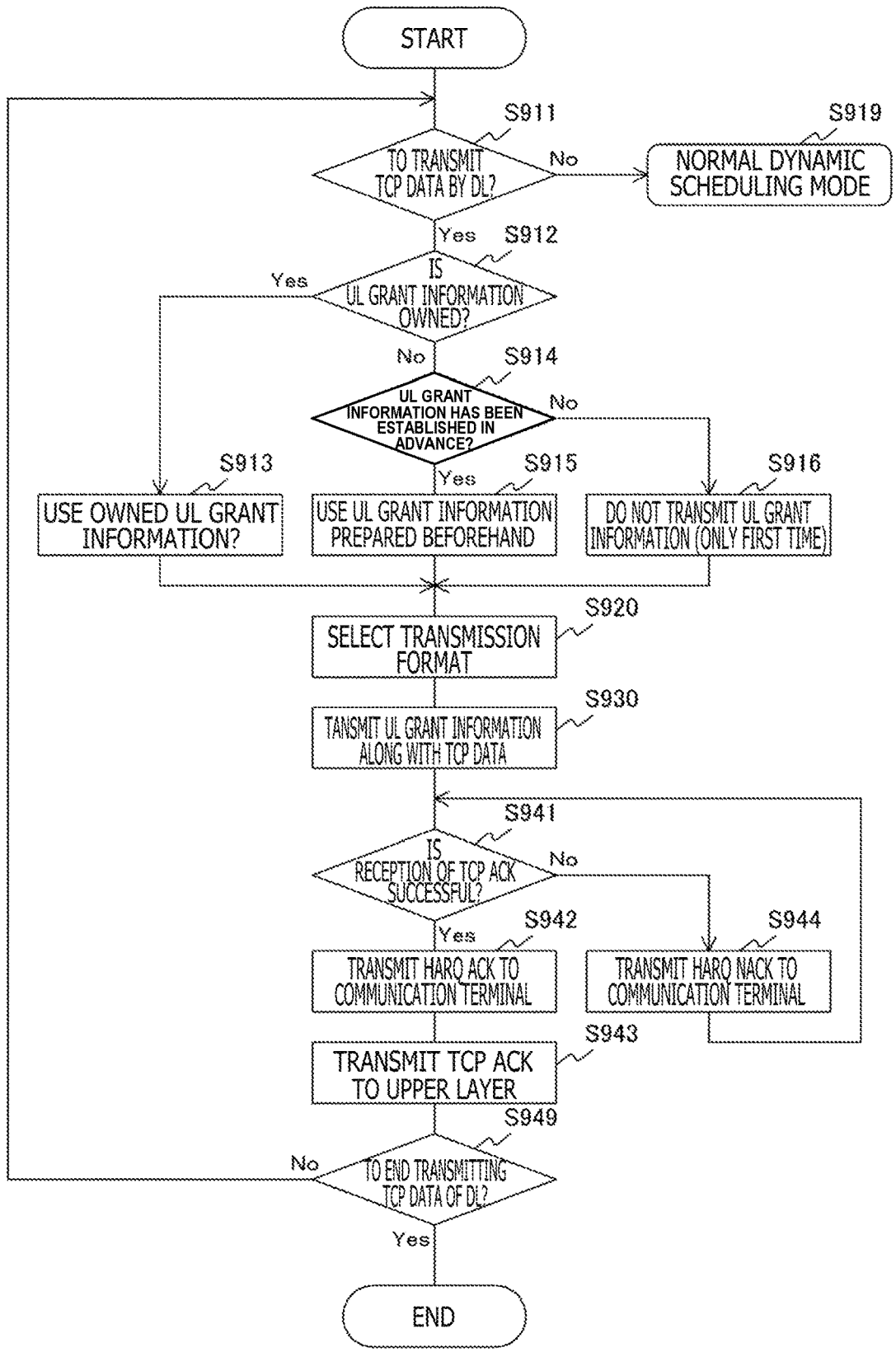
FIG. 17 is a flowchart indicative of one example of a processing procedure of the base station equipment 200 in one embodiment of the present technology.

FIG. 17 depicts a flowchart indicative of one example of a processing procedure of the base station equipment 200 in one embodiment of the present technology.

First, whether or not the data to be transmitted on downlink traffic is TCP data is determined (step S911). If the data is not found to be TCP data (step S911: NO), this downlink traffic is executed by a normal dynamics scheduling mode (step S919). If the data is found to be TCP data (step S911: YES), the downlink traffic is executed in the following procedure.

If the uplink grant information is stored in the storage block 212 of the base station equipment 200 (step S912: YES), it is determined that this uplink grant information is used (step S913). On the other hand, if the uplink grant information is found not stored in the storage block 212 of the base station equipment 200 (step S912: NO), it is determined whether or not the uplink grant information has been established in advance (step S914). If the uplink grant information is found established in advance (step S914: YES), it is determined that the uplink grant information established in advance is used (step S915). If the uplink grant information is found not established in advance (step S914: NO), no uplink grant information is transmitted at the first time (step S916) and it is determined that uplink grant information is generated in accordance with a scheduling request from the communication terminal 100.

The base station equipment 200 selects a format of a frame to be transmitted to the communication terminal 100 (step S920). That is, from among the formats illustrated in FIG. 9 through FIG. 14, the base station equipment 200 selects a format suitable for a purpose. In the case where the entire uplink grant information is transmitted, the third type illustrated in FIG. 11 or FIG. 14 is suitable. In the case where only channel resource allocation information is updated, the second type illustrated in FIG. 10 or FIG. 13 is suitable. In the case where the immediately preceding uplink grant information is used, the first type illustrated in FIG. 9 or FIG. 12 is suitable.

Thus, by use of the frame selected in step S920, the base station equipment 200 transmits TCP data and uplink grant information to the communication terminal 100 (step S930). Here, the uplink grant information determined in steps S912 and S914 is used. However, as described above, if no uplink grant information has been established in advance (step S914: NO), no uplink grant information is transmitted at the first time.

Having transmitted TCP data, the base station equipment 200 waits for an ACK signal of TCP from the communication terminal 100. If the reception of the ACK signal of TCP from the communication terminal 100 is successful (step S941: YES), the base station equipment 200 transmits an ACK signal by HARQ of the layer 2 to the communication terminal 100 (step S942). Next, the base station equipment 200 transmits the ACK signal of TCP to the upper layer (step S943). On the other hand, if the reception of the ACK signal of TCP from the communication terminal 100 is unsuccessful (step S941: NO), the base station equipment 200 transmits a NACK signal by HARQ of the layer 2 to the communication terminal 100 (step S944).

The base station equipment 200 repeats the processing described above until the transmitting of the TCP data of downlink ends (step S949).

Figure 18:
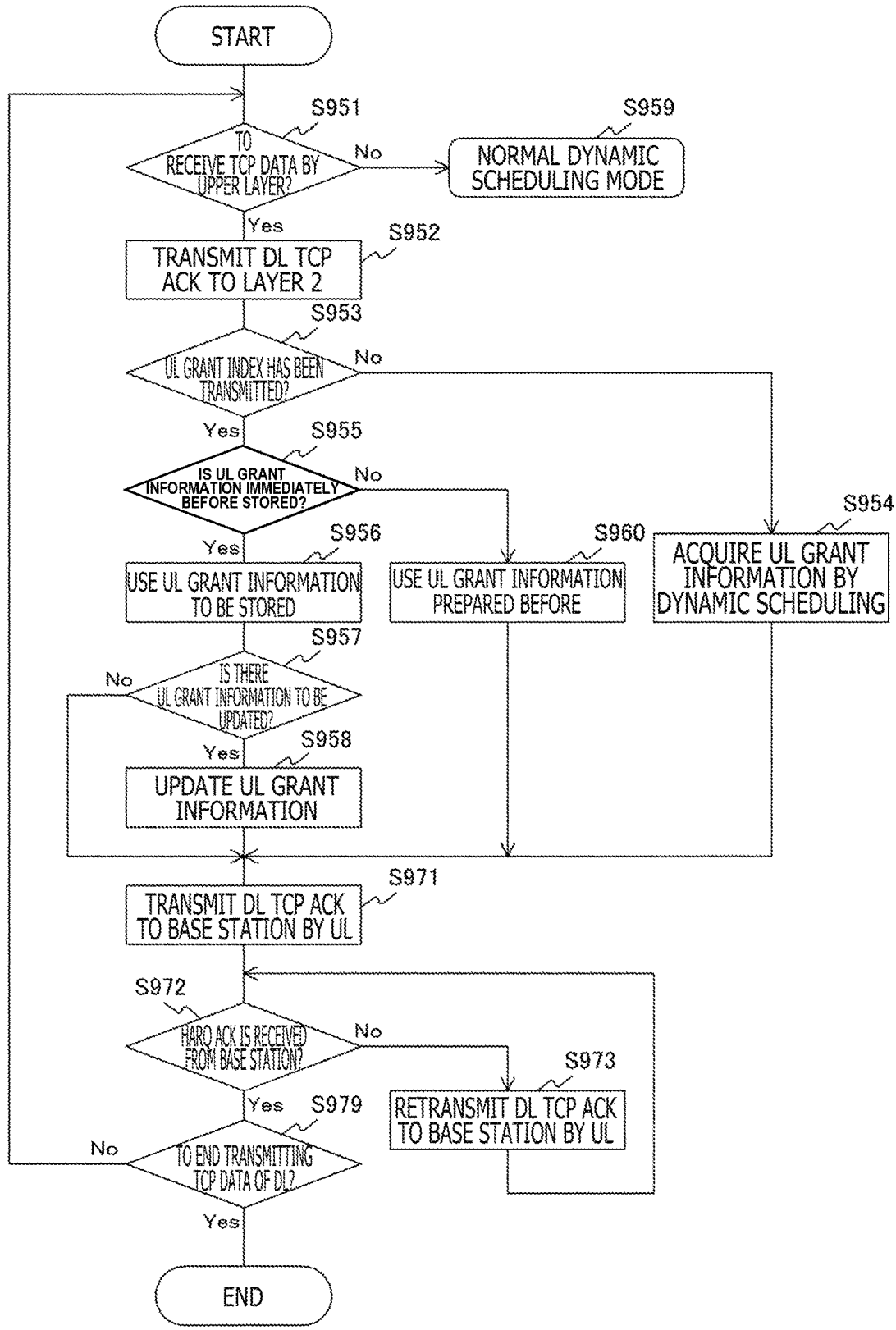
FIG. 18 is a flowchart indicative of one example of the communication terminal 100 in one embodiment of the present technology.

FIG. 18 depicts a flowchart indicative of one example a processing procedure of the communication terminal 100 in one embodiment of the present technology.

The communication terminal 100 waits for the downlink traffic from the base station equipment 200. Then, having receiving the downlink traffic from the base station equipment 200, the communication terminal 100 determines whether or not the data received in the upper layer is TCP data (step S951). If the data is found not the TCP data (step S951: NO), this downlink traffic is executed by the normal dynamics scheduling mode (step S959). If the data is found to be the TCP data (step S951: YES), the downlink traffic is executed in the following procedure.

The communication terminal 100 transmits an ACK signal of TCP for downlink to the layer 2 (step S952). Then, the communication terminal 100 determines whether or not an uplink grant index has been transmitted along with the TCP data by a frame of this downlink (step S953). If no uplink grant index is found transmitted (step S953: NO), the communication terminal 100 acquires the uplink grant information by dynamics scheduling (step S954). That is, the communication terminal 100 transmits a scheduling request to the base station equipment 200 and receives the uplink grant information transmitted from the base station equipment 200.

If the uplink grant index is found transmitted along with the TCP data (step S953: YES), the communication terminal 100 determines whether or not the uplink grant information is stored in the storage block 112 (step S955). If the uplink grant information is found not stored in the storage block 112 (step S955: NO), the 100 determines that the uplink grant information established in advance is used (step S960). If the uplink grant information is found stored in the storage block 112 (step S955: YES), the communication terminal 100 determines that this uplink grant information that gas been established in advance is used (step S956). At this time, if there is any uplink grant information to be updated (step S957: YES), the communication terminal 100 updates the uplink grant information in the storage block 112 (step S958).

On the basis of the uplink grant information determined to be used as described above, the communication terminal 100 transmits an ACK signal of TCP for downlink to the base station equipment 200 (step S971). Subsequently, the base station equipment 200 waits for an ACK signal by HARQ of the layer 2 for the ACK of TCP.

If the reception of the ACK signal by HARQ from the base station equipment 200 is successful (step S972: YES), the communication terminal 100 further determines whether or not the reception of the downlink traffic is continued (step S979). If the reception of the downlink traffic is continued, the communication terminal 100 repeats the processing described above until the reception of the TCP data of downlink ends (step S979: NO). On the other hand, if the reception of the ACK signal by HARQ from the base station equipment 200 is unsuccessful (step S972: No), the communication terminal 100 retransmits the ACK signal of TCP for downlink by to the base station equipment 200 by uplink (step S973).

As described above, in one embodiment of the present technology, if an uplink traffic is included in the sequence of a downlink traffic, uplink grant information is transmitted in the downlink traffic. Consequently, the latency due to dynamics scheduling can be reduced, thereby saving the processing time.

It should be noted that the embodiments described above are illustratively in order to embody the present technology and there are correlations between the matters in the embodiments and the matters for define the invention. Likewise, there are correlations between the matters to define the invention in the scope of claims and the embodiments of the present technology to which the same names as those of the matters to define the invention are attached. While the embodiments of the present technology have been described using specific terms, such description is for illustrative purpose only, and it is to be understood by those skilled in the art that changes and variations may be made without departing from the spirit of the embodiments of the present technology.

It should also be noted that the processing procedures described with reference to the embodiments mentioned above may be understood as methods having these procedure sequences and as a program or a recording medium storing the program for making a computer execute these procedure sequences. This recording medium may include CD (Compact Disc), MD (MiniDisc), DVD (Digital Versatile Disc), memory card, Blu-ray (registered trademark) disc, or the like.

It should be noted that the advantageous effects described in the present description are illustrative only and therefore not limited thereto; namely, there may be any other advantageous effects.

It should also be noted that the present technology may also take the following configuration.

(1) A communication apparatus including:

a frame generating block configured, if, after data is transmitted from an upper layer to another communication apparatus, a receive response signal of the above-mentioned data is required, to generate a predetermined frame that includes transmission grant information for the above-mentioned another communication apparatus to transmit the above-mentioned receive response signal and the above-mentioned data; and a transmitting block configured to transmit the above-mentioned generated frame to the above-mentioned another communication apparatus.

(2) The communication apparatus according to (1) above, in which the above-mentioned transmitting block transmits the above-mentioned frame including the above-mentioned transmission grant information to the above-mentioned another communication apparatus without waiting for a scheduling request for requesting the above-mentioned transmission grant information from the above-mentioned another communication apparatus.

(3) The communication apparatus according to (1) or (2) above, in which the above-mentioned transmission grant information of the above-mentioned predetermined frame includes channel resource allocation information for transmitting the above-mentioned receive response signal.

(4) The communication apparatus according to any one of (1) through (3) above, in which the above-mentioned transmission grant information of the above-mentioned predetermined frame includes a transmission grant index that indicates use of, also next time, transmission grant information used immediately before for transmitting the above-mentioned receive response signal.

(5) The communication apparatus according to (4) above, further including:

a transmission grant information storage block configured to store the above-mentioned transmission grant information used immediately before, in which if the above-mentioned transmission grant index indicates use of, also next time, transmission grant information used immediately before for transmitting the above-mentioned receive response signal, the above-mentioned transmitting block transmits the above-mentioned generated frame by use of channel allocation information stored in the above-mentioned transmission grant information storage block.

(6) The communication apparatus according to any one of (1) through (5) above, in which the above-mentioned upper layer is a layer higher than a data link layer in an OSI reference model.

(7) The communication apparatus according to (6) above, in which a protocol of the above-mentioned upper layer is any one of TCP, DCCP, STCCP, and ICMP.

(8) The communication apparatus according to any one of (1) through (7) above, in which the above-mentioned predetermined frame includes, as one control information format, information for receiving and decoding the above-mentioned data of a first communication link for the above-mentioned another communication apparatus and the above-mentioned transmission grant information of a second communication link for the above-mentioned another communication apparatus to transmit a receive response signal of the above-mentioned data.

(9) The communication apparatus according to any one of (1) through (7) above, in which the above-mentioned predetermined frame includes, as one frame, a first control information format including information for receiving and decoding data of a first communication link for the above-mentioned another communication apparatus and a second control information format having the above-mentioned transmission grant information of a second communication link for the above-mentioned another communication apparatus to transmit a receive response signal of the above-mentioned data.

(10) The communication apparatus according to any one of (1) through (9) above, in which the above-mentioned predetermined frame includes a payload including data of a first communication link for the above-mentioned another communication apparatus and a header including the above-mentioned transmission grant information of a second communication link for the above-mentioned another communication apparatus to transmit a receive response signal of the above-mentioned data.

(11) The communication apparatus according to any one of (1) through (9) above, in which the above-mentioned predetermined frame includes, as a payload, the above-mentioned data of a first communication link for the above-mentioned another communication apparatus and the above-mentioned transmission grant information of a second communication link for the above-mentioned another communication apparatus to transmit a receive response signal of the above-mentioned data.

(12) A communication apparatus including:

a receiving block configured to receive a predetermined frame including data and transmission grant information for transmitting a receive response signal of the above-mentioned data from another communication apparatus by an upper layer; and a transmitting block configured to transmit a receive response signal of the above-mentioned received data in accordance with the above-mentioned transmission grant information to the above-mentioned another communication apparatus.

(13) The communication apparatus according to (12) above, further including:

a transmission grant information storage block configured to store the above-mentioned transmission grant information used immediately before, in which the above-mentioned transmission grant information of the above-mentioned predetermined frame includes a transmission grant index for indicating use of, also next time, the above-mentioned transmission grant information used immediately before; and when the above-mentioned receiving block receives the above-mentioned transmission grant index, the above-mentioned transmitting block transmits a receive response signal of the above-mentioned received data to the above-mentioned another communication apparatus in accordance with the above-mentioned transmission grant information used immediately before stored in the above-mentioned transmission grant information storage block.

(14) A communication system including:

a first communication apparatus, if, after data is transmitted by an upper layer, a receive response signal of the above-mentioned data is required, having a frame generating block configured to generate a predetermined frame including transmission grant information for transmitting the above-mentioned receive response signal and the above-mentioned data, and a first transmitting block configured to transmit the above-mentioned generated frame; and a second communication apparatus having a receiving block configured to receive the above-mentioned predetermined frame from the above-mentioned first communication apparatus by the above-mentioned upper layer and a second transmitting block configured to transmit a receive response signal of the above-mentioned received data to the above-mentioned first communication apparatus in accordance with the above-mentioned transmission grant information.

(15) A program for having a computer execute, if, after data is transmitted to another communication apparatus by an upper layer, a receive response signal of the above-mentioned data is required, a frame generating procedure for generating a predetermined frame including transmission grant information for the above-mentioned another communication apparatus to transmit the above-mentioned receive response signal and the above-mentioned data; and a transmitting procedure for transmitting the above-mentioned generated frame to the above-mentioned another communication apparatus.

(16) A program for having a computer execute a receive procedure for receiving a predetermined frame including data and transmission grant information for transmitting a receive response signal of the above-mentioned data from another communication apparatus by an upper layer; and a transmitting procedure for transmitting a receive response signal of the above-mentioned received data to the above-mentioned another communication apparatus in accordance with the above-mentioned transmission grant information.

(17) A frame transmitting method including:

if a communication apparatus, after transmitting data to another communication apparatus by an upper layer, requires a receive response signal of the above-mentioned data, a frame generating procedure for generating a predetermined frame including transmission grant information for the above-mentioned another communication apparatus to transmit the above-mentioned receive response signal and the above-mentioned data; and a transmitting procedure for the above-mentioned communication apparatus to transmit the above-mentioned generated frame to the above-mentioned another communication apparatus.

(18) A data structure to be transmitted from a first communication apparatus to a second communication apparatus by an upper layer, the above-mentioned data structure including:

data of a communication link for the above-mentioned second communication apparatus; and transmission grant information for the above-mentioned second communication apparatus to transmit a receive response signal of the above-mentioned data.

REFERENCE SIGNS LIST

10 . . . Device layer
20 . . . Core network
30 . . . Network gateway
40 . . . IP network
50 . . . Service platform
60 . . . Application server
100 . . . Communication terminal
110 . . . Layer-1 processing block
111 . . . Control information processing block
112 . . . Storage block
113 . . . Wireless communication processing block
119 . . . Antenna
120 . . . Layer-2 processing block
130 . . . Upper-layer processing block
200 . . . Base station equipment
201 . . . Macro-cell base station equipment
202 . . . Small-cell base station equipment
210 . . . Layer-1 processing block
211 . . . Control information processing block
212 . . . Storage block
213 . . . Wireless communication processing block
219 . . . Antenna
220 . . . Layer-2 processing block
230 . . . Upper-layer processing block
291 . . . Cell area of macro-cell base station equipment
292 . . . Cell area of small-cell base station equipment
310 . . . Control entity
320 . . . Core network
330, 340 . . . Gateway apparatus
400 . . . External network

The invention claimed is:

1. A method for a user equipment, the method comprising:
receiving from a base station:
a Physical Downlink Shared Channel (PDSCH) carrying a transport block to which higher layer data is mapped, wherein the higher layer data is Transmission Control Protocol (TCP) data, and
a Physical Downlink Control Channel (PDCCH) scheduling the PDSCH,
wherein the PDCCH carries Downlink Control Information (DCI) following a predetermined DCI format, wherein the DCI contains information regarding downlink resource assignment for the PDSCH and uplink resource assignment;
transmitting, to the base station, an acknowledgement signal using the information regarding uplink resource assignment, the acknowledgement signal indicating an acknowledgement for the received higher layer data.

2. The method according to claim 1, wherein the PDSCH and the PDCCH are received in one or two slots as time domain resources.

3. The method according to claim 1, wherein the DCI following the predetermined DCI format contains at least one of: modulation and coding scheme, new data indicator, redundancy version, Hybrid Automatic Repeat reQuest (HARQ) process number, downlink assignment index, or Transmission Power Control (TPC) command for uplink.

4. The method according to claim 2, wherein the one or two slots in which the PDSCH and the PDCCH are received are included in one subframe.

5. A method for a communication apparatus in a base station side, the method comprising:
transmitting to a user equipment:
a Physical Downlink Shared Channel (PDSCH) carrying a transport block to which higher layer data is mapped, wherein the higher layer data is Transmission Control Protocol (TCP) data, and
a Physical Downlink Control Channel (PDCCH) scheduling the PDSCH,
wherein the PDCCH carries Downlink Control Information (DCI) following a predetermined DCI format, wherein the DCI contains information regarding downlink resource assignment for the PDSCH and uplink resource assignment;
receiving, from the user equipment, an acknowledgement signal using the information regarding uplink resource assignment, the acknowledgement signal indicating an acknowledgement for the received higher layer data.

6. The method according to claim 5, wherein the PDSCH and the PDCCH are transmitted in one or two slots as time domain resources.

7. The method according to claim 5, wherein the DCI following the predetermined DCI format contains at least one of: modulation and coding scheme, new data indicator, redundancy version, Hybrid Automatic Repeat reQuest (HARQ) process number, downlink assignment index, or Transmission Power Control (TPC) command for uplink.

8. The method according to claim 6, wherein the one or two slots in which the PDSCH and the PDCCH are received are included in one subframe.

9. A user equipment comprising:
one or more radio transceiver; and
circuitry configured to:
receive, via the one or more radio transceiver, from a base station:
a Physical Downlink Shared Channel (PDSCH) carrying a transport block to which higher layer data is mapped, wherein the higher layer data is Transmission Control Protocol (TCP) data, and
a Physical Downlink Control Channel (PDCCH) scheduling the PDSCH,
wherein the PDCCH carries Downlink Control Information (DCI) following a predetermined DCI format, wherein the DCI contains information regarding downlink resource assignment for the PDSCH and uplink resource assignment; and
transmit, to the base station, an acknowledgement signal using the information regarding uplink resource assignment, the acknowledgement signal indicating an acknowledgement for the received higher layer data.

10. The user equipment according to claim 9, wherein the PDSCH and the PDCCH are received in one or two slots as time domain resources.

11. The user equipment according to claim 9, wherein the DCI following the predetermined DCI format contains at least one of: modulation and coding scheme, new data indicator, redundancy version, Hybrid Automatic Repeat reQuest (HARQ) process number, downlink assignment index, or Transmission Power Control (TPC) command for uplink.

12. A communication apparatus in a base station side, the communication apparatus comprising:
one or more radio transceiver; and
circuitry configured to:
transmit, via the one or more radio transceiver, to a user equipment:
a Physical Downlink Shared Channel (PDSCH) carrying a transport block to which higher layer data is mapped, wherein the higher layer data is Transmission Control Protocol (TCP) data, and
a Physical Downlink Control Channel (PDCCH) scheduling the PDSCH,
wherein the PDCCH carrying Downlink Control Information (DCI) follows a predetermined DCI format, wherein the DCI contains information regarding downlink resource assignment for the PDSCH and uplink resource assignment; and
receive, from the user equipment, an acknowledgement signal using the information regarding uplink resource assignment, the acknowledgement signal indicating an acknowledgement for the received higher layer data.

13. The communication apparatus according to claim 12, wherein the PDSCH and the PDCCH are transmitted in one or two slots as time domain resources.

* * * * *